No. 12,042.

Reissued Oct. 7, 1902.

C. J. McPHERSON.

ROLLER COTTON GIN.

(Application filed July 31, 1902.)

3 Sheets—Sheet 1.

Witnesses;
Everett S. Emery
Thomas B. Booth

Inventor
Charles Jacob McPherson,
by Frederick L. Emery
Atty.

THE NORRIS PETERS CO., WASHINGTON, D. C.

No. 12,042. Reissued Oct. 7, 1902.

C. J. McPHERSON.

ROLLER COTTON GIN.

(Application filed July 31, 1902.)

3 Sheets—Sheet 2.

Witnesses:
Everett S. Emery
Thomas B. Booth

Inventor:
Charles Jacob McPherson,
by Melvin L. Emery
Atty.

THE NORRIS PETERS CO., WASHINGTON, D. C.

No. 12,042. Reissued Oct. 7, 1902.

C. J. McPHERSON.

ROLLER COTTON GIN.

(Application filed July 31, 1902.)

3 Sheets—Sheet 3.

Witnesses;
Everett S. Emery
Thomas B. Booth

Inventor,
Charles Jacob McPherson,
by Frederick L. Emery
Atty.

THE NORRIS PETERS CO., WASHINGTON, D. C.

UNITED STATES PATENT OFFICE.

CHARLES JACOB McPHERSON, OF SOUTH FRAMINGHAM, MASSACHUSETTS, ASSIGNOR TO THE AMERICAN COTTON IMPROVEMENT COMPANY, OF PHŒNIX, ARIZONA TERRITORY, A CORPORATION OF ARIZONA TERRITORY.

ROLLER COTTON-GIN.

SPECIFICATION forming part of Reissued Letters Patent No. 12,042, dated October 7, 1902.

Original No. 701,814, dated June 3, 1902. Application for reissue filed July 31, 1902. Serial No. 117,853.

*To all whom it may concern:*

Be it known that I, CHARLES JACOB McPHERSON, a citizen of the United States, residing at South Framingham, in the county of Middlesex and Commonwealth of Massachusetts, have invented Improvements in Roller Cotton-Gins, of which the following description, in connection with the accompanying drawings, is a specification, like letters on the drawings representing like parts.

This invention relates to roller cotton-gins; and it consists in the features and in the construction, combination, and arrangement of parts hereinafter described, and particularly pointed out in the claims following the description, reference being had to the accompanying drawings, forming a part of this specification, wherein—

Figure 1:
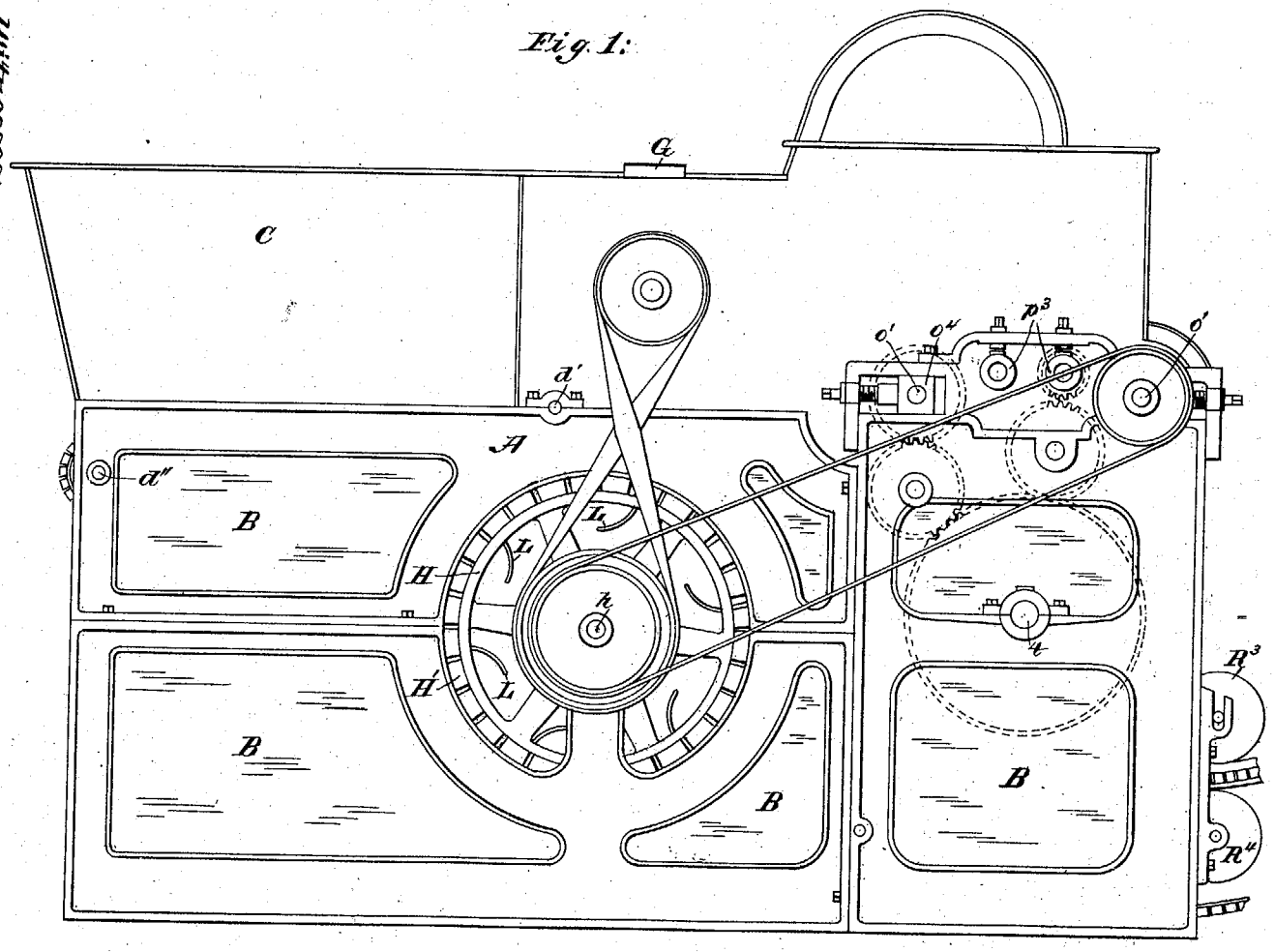
Figure 2:
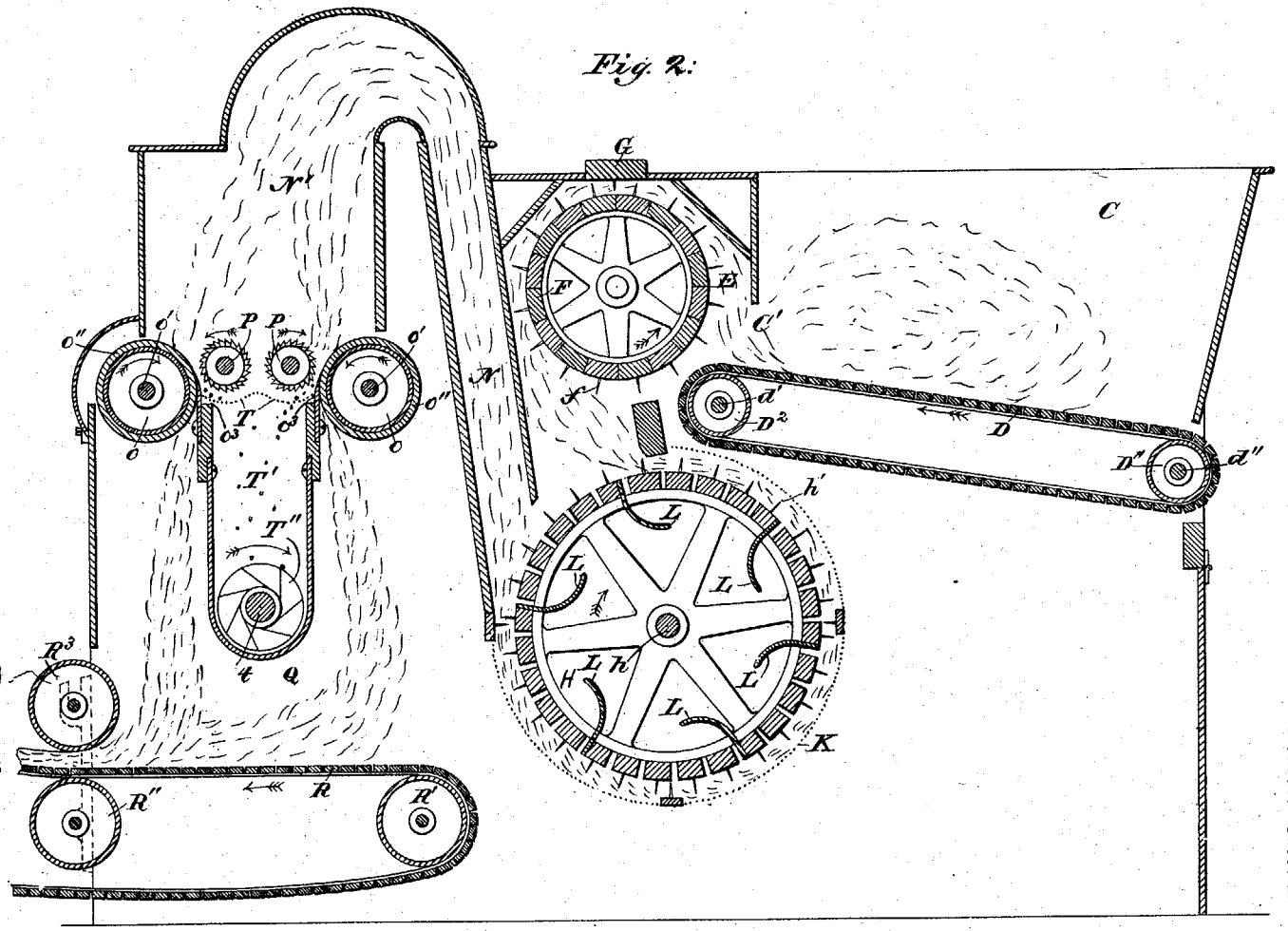
Figure 4:
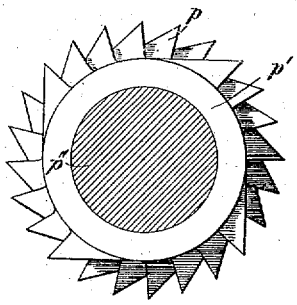
Figure 3:
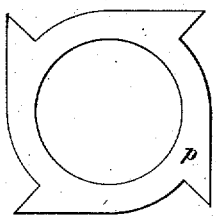
Figure 5:
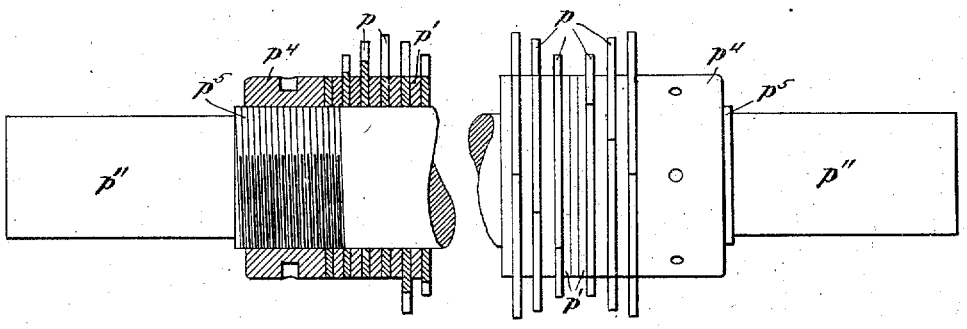

Figure 1 is a view in side elevation of my improved cotton-gin. Fig. 2 is a vertical longitudinal sectional view of the same. Fig. 3 is a detail end view of one of the comb-disks on the rotary combs for separating the seeds from the lint. Fig. 4 is an end elevation of one of said rotary combs, and Fig. 5 is a partial side elevation and section of one of said rotary combs.

In the drawings, A A represent the side frames, preferably made of metal and secured at a proper distance apart by means of stays or braces in any suitable or desirable manner.

B B represent the sides of the inclosing shell of the machine.

C is the hopper, into which the seed-cotton is fed onto an endless traveling apron D, located at the bottom of said hopper, as is common in devices of this kind. The endless apron D operates to deliver the seed-cotton to a rotary feed-cylinder F, provided with rows of teeth *f f*, which take the seed-cotton from the apron D and carry it between the teeth of a comb G, which open the fibers of the cotton, and the feed-cylinder then delivers the cotton to a rotary cleaning-cylinder H, inclosed in a screen K. The cleaning-cylinder is provided with a series of fan-blades L, which serve to force air up through an upwardly-projecting chute or conduit N, which leads from the cylinder H to a ginning-chamber N′.

The parts above described form no part of the present invention and are merely briefly alluded to in order to explain the means employed for feeding the seed-cotton to the ginning-chamber N′. In the lower portion of said ginning-chamber are located the rotary ginning-rollers O O, secured to the shafts O′ O′, journaled in horizontally-adjustable bearings $O^4$ $O^4$, located in slides in the frames A A and provided with a suitable adjusting device, as shown in Fig. 1. Each of such ginning-rollers is provided on its exterior with an annular covering O″, and in contact with it is held a stationary bed-knife $O^3$, as shown in Fig. 2. The covering O″ of the rollers is preferably of hard-felted material, such as hair or wool, which is felted very hard—that is to say, not loose or fibrous, but hard and compact. The rotary felted rolls cause the lint to be fed between them and the stationary bed-knives $O^3$ $O^3$, while at the same time the seeds are separated from the lint by the action of the rotary combs P P, as shown. The lint is received into the lint-chamber Q and falls upon the endless condensing-apron R, which which carries the lint to the press, as usual, or the lint instead of being carried away on the apron may be blown away or conveyed by an air-blast in the usual way.

The apron R is supported upon a roller R′ and is fed onward by a roller R″, above which is located a loosely-revolving condensing-roller $R^3$, which presses upon the cotton as it comes from the lint-chamber and forms a bat ready for the pressing and baling operation, as usual.

The seeds separated from the lint by the action of the rotary combs P P fall through screens T T into the seed-chamber T′, from which they are removed by the usual spiral conveyer T″. (Shown in Fig. 2.)

The conveyer T″ is secured to a shaft *t*, journaled in bearings in the sides A A, and in practice I prefer to apply the main-belt power to such conveyer-shaft *t*.

Each rotary comb P is composed of a series of toothed washers $p$ and spacer-disks $p'$ $p'$, arranged intermediate between such toothed washers upon a rotary shaft $p''$, journaled in bearings $p^3$ $p^3$, adjustably secured to the frames A A, as shown. The said toothed washers $p$ are spirally arranged upon the shaft $p''$ and confined in place upon the shaft $p''$ by means of clamping-nuts $p^4$ $p^4$, screwed upon the screw-threaded portions $p^5$ $p^5$ of said shaft, as shown in Fig. 4, and by this arrangement the said toothed washers $p$ are held in their proper positions upon the rotary shaft $p''$, as shown in Fig. 5.

The ginning-rollers O O may be adjusted relative to the bed-knives $O^3$ $O^3$ so as to cause their felt coverings O'' O'' to be held in close contact with the upper edges of the bed-knives $O^3$ $O^3$, thus compensating for any wear that may take place from time to time on such felt coverings.

The rotary combs P P may be adjusted up and down, so as to place them in proper positions relative to the upper edges of the bed-knives $O^3$ $O^3$, so as to obtain the best results in the carrying out of the ginning operation.

In this my improved cotton-gin I cause dirt, sand, and gritty particles to be expelled and separated from the seed-cotton by the action of the fans on the cleaning-cylinder H, and this is very essential and advantageous for the purpose of preventing the rapid wearing of the ginning device, as well as preventing fire taking place during the ginning operation.

The rotary spiral combs P P serve to comb or roll out the seeds from the seed-cotton while the latter is being held and fed onward between the ginning-rolls and bed-knives, by which arrangement the lint is not injured or broken, causing its fibers to be left in the natural state, similar to the operation of pulling the seeds by hand labor.

By having the coverings on the ginning-rolls made of hard-felted material, as hereinabove described, the heating of the bed-knives is materially prevented, thus admitting a very high rate of speed of such ginning-rollers.

The general construction of this machine is a great improvement on what are termed "saw-gins" and the operation is the opposite of such machines, in that the rotary combs in my machine act upon the seeds instead of upon the lint, thus preventing the lint from being torn or broken.

In practice I prefer to drive the machine by belt power applied to a pulley on the seed-conveyer shaft $l$ and connect the latter by belts or gears to the various rotary shafts containing the operative devices, and I wish to state that I do not desire to confine myself to any particular driving mechanism of the different shafts to which the operative devices are connected, as this may be done in any well-known manner without departing from the essence of my invention.

The operation is is follows: The seed-cotton is placed in the hopper C and is fed in the manner described up through the conduit N and into the ginning-chamber N' and there conducted between the ginning-rolls and revolving combs, causing the lint to be drawn between the ginning-rolls and bed-knives, while the rotary combs separate the seed from the lint. The seeds are conducted through the screen T into the seed-chamber T' and automatically removed therefrom by the conveyer T''. The lint after passing between the ginning-rolls and bed-knives falls into the lint-chamber, from which it is conveyed by the endless condensing-apron R to the press and baling apparatus, as usual.

Having thus fully described the nature, construction, and operation of my invention, I wish to secure by Letters Patent and claim—

1. In a cotton-gin, the combination of a rotary ginning-roll provided with a covering of hard-felted material, a stationary bed-knife fixed adjacent to such roll, and a rotary comb-roller consisting of a shaft, a series of toothed washers arranged on the shaft, and intermediate disks disposed between the toothed washers, the teeth on the washers being disposed in parallel spiral lines about the shaft, substantially as shown and described and for the purpose specified.

2. In a cotton-gin, the combination of a rotary ginning-roll provided with a covering of hard-felted material, a stationary bed-knife fixed adjacent to such roll, and a rotary comb-roller consisting of a shaft, a series of toothed washers arranged on the shaft, intermediate disks arranged on the shaft between the toothed washers, and nuts screwed on the threaded ends of the shaft and operating to clamp the toothed washers and intermediate disks upon said shaft, the teeth of the washers projecting beyond the peripheries of the disks and being disposed in parallel spiral lines about the shaft, substantially as described.

3. In a cotton-gin, a ginning-roll, a bed-knife, and a coöperating rotary combing member provided with teeth having paths of movement transverse to the edge of said knife.

4. In a cotton-gin, a ginning-roll, a bed-knife, and a coöperating rotary combing member provided with substantially spirally-arranged teeth having paths of movement transverse to the edge of said knife.

5. In a cotton-gin, a ginning-roll, a bed-knife and a rotary combing member having teeth located along said combing member in a progressively-advancing relation and having paths of movement transverse to the edge of said knife.

6. In a cotton-gin, a ginning-roll, a bed-knife and a rotary toothed combing member rotatable about an axis substantially parallel with that of the ginning-roll.

7. In a cotton-gin, a ginning-chamber, a plurality of ginning-rolls, bed-knives coöperating therewith and opposed rotating combing members for said ginning-rolls.

8. In a cotton-gin, a ginning-chamber, two separated ginning-rolls, bed-knives therefor and a pair of oppositely-rotating combing members between said rolls coöperating therewith.

9. In a cotton-gin a plurality of ginning-rolls, bed-knives therefor and rotary combing members coöperating therewith provided with teeth having paths of movement transverse to the edges of their respective bed-knives.

In witness whereof I have hereunto set my hand.

CHARLES JACOB McPHERSON.

Witnesses:

THOMAS B. BOOTH,

ARTHUR P. REDMAN.